US008626951B2

(12) United States Patent
Casey et al.

(10) Patent No.: US 8,626,951 B2
(45) Date of Patent: Jan. 7, 2014

(54) INTEROPERABILITY OF NETWORK APPLICATIONS IN A COMMUNICATIONS ENVIRONMENT

(75) Inventors: Tamara L. Casey, Henderson, NV (US); David P. Martin, Chantilly, VA (US)

(73) Assignee: 4DK Technologies, Inc., Herndon, VA (US)

( * ) Notice: Subject to any disclaimer, the term of this patent is extended or adjusted under 35 U.S.C. 154(b) by 1250 days.

(21) Appl. No.: 11/739,023

(22) Filed: Apr. 23, 2007

(65) Prior Publication Data

US 2008/0263187 A1  Oct. 23, 2008

(51) Int. Cl.
  *G06F 15/16*  (2006.01)

(52) U.S. Cl.
  USPC .... 709/246; 719/315; 719/328; 707/999.102; 707/999.103; 707/999.104; 707/999.101; 707/E17.009; 707/E17.102; 707/E17.095; 707/E17.123; 707/E17.032; 707/E17.124; 709/203; 709/229; 705/3; 375/150

(58) Field of Classification Search
  USPC ........................................................ 709/246
  See application file for complete search history.

(56) References Cited

U.S. PATENT DOCUMENTS

| | | | |
|---|---|---|---|
| 4,751,634 A * | 6/1988 | Burrus et al. ................... 710/63 |
| 5,832,483 A | 11/1998 | Barker | |
| 6,182,148 B1 * | 1/2001 | Tout ............................. 709/245 |
| 6,266,698 B1 | 7/2001 | Klein et al. | |
| 6,272,127 B1 | 8/2001 | Golden et al. | |
| 6,336,135 B1 | 1/2002 | Niblett et al. | |
| 6,418,448 B1 * | 7/2002 | Sarkar ................................ 1/1 |
| 6,445,682 B1 * | 9/2002 | Weitz ............................ 370/257 |
| 6,920,130 B2 | 7/2005 | Ramey | |
| 6,948,001 B1 * | 9/2005 | Bradley ......................... 709/246 |
| 7,418,456 B2 * | 8/2008 | Charlet et al. ........................ 1/1 |
| 7,599,985 B2 * | 10/2009 | Doyle et al. .................. 709/202 |
| 7,814,470 B2 * | 10/2010 | Mamou et al. ................ 717/162 |
| 2002/0091863 A1 * | 7/2002 | Schug ............................ 709/250 |
| 2003/0086428 A1 * | 5/2003 | Quinquis et al. ............ 370/395.1 |
| 2003/0193994 A1 * | 10/2003 | Stickler ......................... 375/150 |
| 2004/0083291 A1 * | 4/2004 | Pessi et al. .................... 709/227 |
| 2005/0198394 A1 * | 9/2005 | Waldorf et al. ............... 709/246 |
| 2005/0203892 A1 | 9/2005 | Wesley et al. | |
| 2005/0246716 A1 * | 11/2005 | Smith et al. ................... 719/315 |
| 2005/0262188 A1 * | 11/2005 | Mamou et al. ................ 709/203 |
| 2005/0262192 A1 * | 11/2005 | Mamou et al. ................ 709/203 |
| 2005/0289265 A1 | 12/2005 | Illowsky et al. | |
| 2006/0052130 A1 | 3/2006 | Choksi | |
| 2006/0074906 A1 * | 4/2006 | Steels et al. ....................... 707/5 |

(Continued)

OTHER PUBLICATIONS

Ebert et al., "GraX—An Interchange Format for Reengineering Tools", Oct. 1999.*

(Continued)

*Primary Examiner* — Ondrej Vostal
(74) *Attorney, Agent, or Firm* — Fenwick & West LLP

(57) ABSTRACT

An interoperability system abstracts the protocols used by multiple network applications into an interoperability framework, thereby allowing the network applications to interoperate with each other and/or with modules for providing enhanced functionalities. The interoperability framework includes a number of adapters that modularize the components needed for interoperation and abstracts content from the underlying protocols and procedures used by the network applications. The interoperability framework includes a resource control that enables the network applications to access shared resources, such as data and content used by the network applications, thus allowing the applications to interoperate and for functionality enhancements to be added.

68 Claims, 2 Drawing Sheets

(56) References Cited

U.S. PATENT DOCUMENTS

| | | | |
|---|---|---|---|
| 2006/0179150 A1* | 8/2006 | Farley et al. | 709/228 |
| 2006/0253459 A1* | 11/2006 | Kahn et al. | 707/10 |
| 2006/0287890 A1* | 12/2006 | Stead et al. | 705/3 |
| 2007/0061487 A1* | 3/2007 | Moore et al. | 709/246 |
| 2007/0150540 A1* | 6/2007 | Kaler et al. | 709/205 |
| 2007/0168374 A1* | 7/2007 | Bourne et al. | 707/101 |
| 2007/0209011 A1* | 9/2007 | Padmanabhuni et al. | 715/762 |
| 2008/0046292 A1* | 2/2008 | Myers et al. | 705/3 |
| 2008/0155500 A1* | 6/2008 | Richmond | 717/109 |
| 2008/0229289 A1* | 9/2008 | Nauman et al. | 717/136 |
| 2009/0012992 A1* | 1/2009 | Gill et al. | 707/103 R |
| 2009/0307387 A1* | 12/2009 | Jeong et al. | 710/33 |
| 2010/0257370 A1* | 10/2010 | Yoon et al. | 713/189 |

OTHER PUBLICATIONS

Mendling et al., "EPC markup language (EPML): an XML-based interchange format for event-driven process chains (EPC)", 2005.*
Hunter et al., "Combining RDF and XML Schemas to Enhance Interoperability Between Metadata Application Profiles", 2001.*
Glushko et al., "An XML framework for Agent-based E-commerce", 1999.*
Safari, "Matadata and the Web", 2004.*
Ding et al., "Automatic Creation and Simplified Querying of Semantic Web Content: An Approach Based on Information-Extraction Ontologies", 2006.*
Godby et al., "Two Paths to Interoperable Metadata".*
Reilly et al., "MIT's CWSpace project: packaging metadata for archiving educational content in DSpace", 2006.*
Zeng et al., "Metadata Interoperability and Standardization—A Study of Methodology Part II", 2006.*
Chan et al., "Metadata Interoperability and Standardization—A Study of Methodology Part I", 2006.*
Petridis et al., "Knowledge representation and semantic annotation of multimedia content", 2006.*
Lewis et al., "An Integrated Content and Metadata Based Retrieval System for Art", 2004.*
Chang, "The Holy Grail of Content-Based Media Analysis", 2002.*
PCT International Search Report and Written Opinion, PCT/US08/60703 dated Aug. 22, 2008, 11 pages.

* cited by examiner

INTEROPERABILITY OF NETWORK APPLICATIONS IN A COMMUNICATIONS ENVIRONMENT

BACKGROUND

This invention relates generally to communications systems, and in particular to providing interoperability and enhanced functionality for network applications in a communications environment.

There are a multitude of different network applications that provide various services for mobile communications subscribers, including voice, data, text messaging, push-to-talk (PTT), along with many other types of services. These network applications are usually designed independently of each other and often by different entities, so they commonly use their own protocols and proprietary data formats. Because of the resulting incompatibilities, these different network applications rarely interoperate. And if they do, it is only in very limited ways. Presently, different network applications rarely interoperate unless they are specifically programmed to do so or unless there is a specific apparatus designed to allow each of the network applications to communicate in a language the other understands.

The problem also exists with network applications that provide similar services but for different service providers or on different platforms (such as CDMA or GSM). For example, one network application may implement a PTT service for one service provider while another network application implements a different PTT service for a different service provider. Because these PTT applications use different protocols and different data formats (e.g., different codecs), there is no way for them to communicate. Hence, users of one PTT service cannot communicate with users of the other PTT service.

To solve the problem of incompatibility between network applications, communications service providers have developed specialized gateways that convert between the protocols of two network applications. FIG. 1 illustrates an example of a gateway 110 that allows a network application running on one application server 120-A to interoperate with a network application running on another application server 120-B via their respective networks 140-A and 140-B. The gateway 110 receives information from a first application server 120-A in a first protocol used by that network application, and the gateway 110 then converts that information into a second protocol used by the second network application on the application server 120-B. The gateway 110 also provides the reverse conversion for communications from application server 120-B to application server 120-A. In this way, the gateway 110 emulates each network application on behalf of the other, thereby allowing the two network applications to interoperate. Clients 130-A using one network application may thus communicate with clients 130-B using a second network application, and vice versa.

But this gateway approach is not very scalable, since a new gateway must be designed for each pair of network applications to interoperate. For example, if a third network application were added to the network system shown in FIG. 1, there would have to be two new gateways specially designed—one for interoperability between the new network application and each of the existing network applications. This problem grows as network applications are added. In the general case, if there are N network applications in a system, the next $(N+1)^{th}$ network application would require N new gateways for interoperability with each of the existing N network applications. Accordingly, as each new network application is introduced, the number of new gateways that must be added increases, thereby increasing the complexity and cost of each new network application. Scalability thus presents a significant obstacle in the quest for interoperability among network applications in a communications environment.

Another problem of the existing communication architecture is that introducing new applications often requires modification of the network application itself, so enhancing functionality of the network applications is difficult. Typically, the application data and other content used to provide services by each network application are encoded in the application's own special format. To provide an enhanced service that uses the network application data, the provider would have to know the format and protocols used by the network application to extract the application data for any useful purpose. And even if these were known, a special enhancement application would have to be added and customized for each network application that is to have the functionality enhancement, which again presents a scalability problem similar to the one described above.

Accordingly, what is needed is an architecture for communications networks that exposes the data and content used by particular network applications so that the data and content are available for other uses, such as for use by other network applications and/or for providing functionality enhancements.

SUMMARY

Rather than emulate each network application, as in the gateway approach, embodiments of the invention allow interoperability among multiple network applications by abstracting the protocols and data formats used by the network applications into an interoperability framework. The interoperability framework modularizes the components needed for interoperation and abstracts data and content from the underlying protocols and data formats used by the network applications. By exposing the data and content used by the network applications, the interoperability framework enables various network applications to share the data so that it can be used by the other applications. This allows the network applications to interoperate, and it also allows the functionalities of particular network applications to be enhanced without requiring the network applications themselves to be modified.

In one embodiment, the interoperability domain includes a resource control engine that controls which features of the services can interoperate and resolves any resource contention issues based on contextual information. Various interoperability adapters extract the content or data used by the corresponding network application, tag the data, and provide the data to the interoperability domain via the resource control. When receiving information from a network application, the resource control directs the shared data into a shared resources repository (which may be implemented, e.g., as a shared memory or a direction to a path to where the data can be found). In this way, metadata used by each network application are stored in the interoperability domain may, where the resource control handles the sharing of the shared resources among the network applications as needed for interoperability.

The interoperability adapters may also receive data from the interoperability domain, where the data are intended for a network application or client with which the adapters are associated. Accordingly, the adapters convert the data into an appropriate format and pass the data according to the desired routing. For example, when the interoperability adapters receive information from the shared resources, they may bind the data into a data stream for that network application in the protocol used by the network application. In this way, the interoperability adapters allow communication in either direction between the protocol used by the particular network application and the common format of the interoperability domain.

In addition to interoperability, embodiments of the invention allow for functional enhancements to be added to the network applications without needing to change the network applications themselves. This can be done, for example, by generating new functional modules that act upon the data in the shared resources used by a particular network application. In this aspect of such an embodiment, the interoperability enabled by the system is between an existing network application and a new functional module, rather than between multiple network applications.

In one embodiment, access to the shared resources and routing of the data are controlled based on context information, which may describe the state of the network, the services, the network application, the client, or any other aspects of the system.

BRIEF DESCRIPTION OF THE DRAWINGS

Embodiments of the invention will be described below with reference to the accompanying drawings. Like reference numerals are used for like elements in the accompanying drawings.

DETAILED DESCRIPTION

Overview of Interoperability Domain

Figure 1:
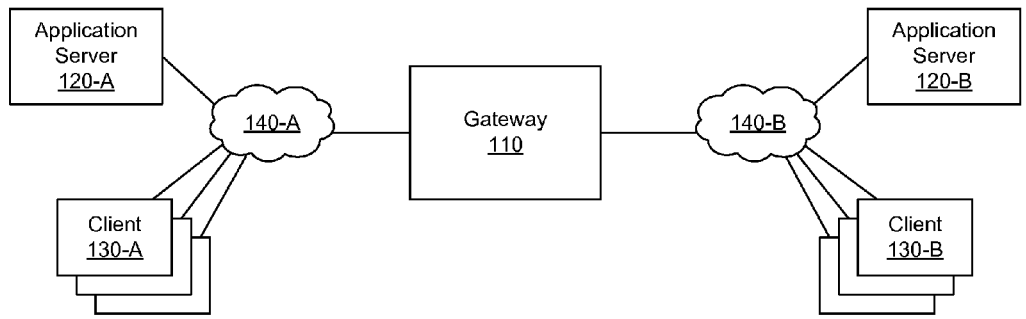
FIG. 1 is a schematic drawing of a prior art gateway that allows communications between two network applications.
Figure 2:
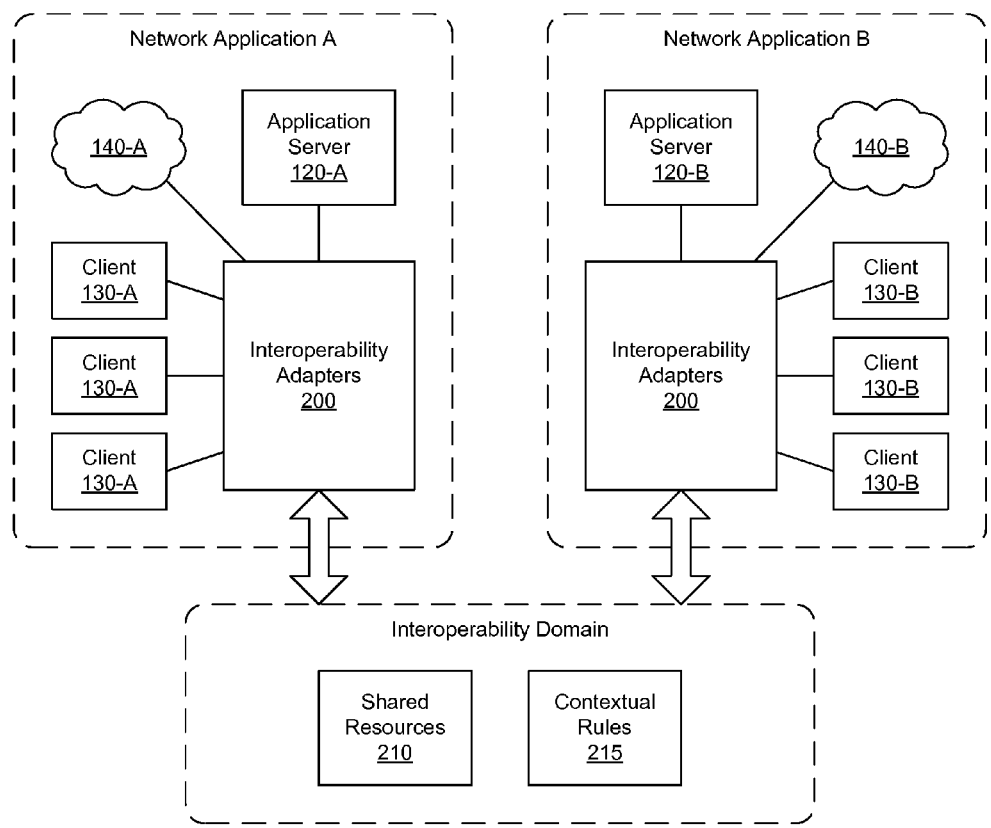
FIG. 2 illustrates an arrangement for enabling interoperation between multiple network applications, in accordance with an embodiment of the invention.

FIG. 2 illustrates an arrangement for enabling interoperation among multiple network applications. In the system shown, one or more network applications may reside on an application server 120. Different application servers (e.g., 120-A and 120-B) may be operated by the same or by different service providers to provide different network applications for their subscribers, and the various network applications may be configured for use with the same or with different platforms (e.g., cellular phones, personal computers, or any other devices capable of electronic communication). In FIG. 2, application server 120-A provides a first network application for clients 130-A, and application server 120-B provides a second network application for clients 130-B.

Network applications may comprise code, logic, and combinations thereof, and they may reside on one or more systems in a communications network infrastructure. A network application performs communications functionalities that implement a service on a communications network. Examples of network applications include voice applications (e.g., cellular, VoIP, PTT, and other voice services), messaging applications (such as email, SMS, MMS, IM, voicemail, and other asynchronous communication services), and Web service applications (e.g., weather, mapping, and other information retrieval services).

The network applications may be accessed by a subscriber using a client 130 in communication with an associated application server 120 via a communications network 140. As shown in FIG. 2, the connections are shown as being through interoperability adapters 200; however, the clients 130 may be able to communicate with each other in peer-to-peer fashion or with the application server 120 via a network 140. A client 130 may comprise hardware and/or software elements that reside in a communication device and can be used to execute a specific function or set of functions. Used together, the client 130 and application server 120 may provide a network service to a subscriber, such as voice calling, push-to-talk (PTT) messaging, text and multimedia messaging, and many other types of services offered in a communications environment.

In a typical communication device on which a client 130 resides, use of the device's capabilities enables the user to take advantage of various services, such as voice calling, messaging, and data services. Network applications typically implement communications services, which are typically products that a user subscribed to and is charged for use thereof, often by metering the user's access to the services. A service may be implemented by a collection of functions, applications, and/or other services that can be called and executed in any order. Usually accessed through a user interface, the behavior of a service typically depends on the user input and possibly other events.

Although one set of clients 130-A are shown accessing one application server 120-A while another set of clients 130-B are accessing another application server 120-B, any of the clients may have access to either or both of the application servers 130-A and 130-B so that their subscribers may enjoy the network application associated therewith. For example, the application servers 120-A and 120-B may provide different communications services for the same set of subscribers (e.g., voice and text messaging for a particular service provider), or they may provide similar or different services for different sets of subscribers (e.g., competing IM services for different service providers).

Embodiments of the invention include one or more interoperability adapters 200 for each network application. Although the interoperability adapters 200 are shown as a single functional block, they may be implemented in any combination of modules or as a single module running on the same system. The interoperability adapters 200 may physically reside on any hardware in the network, and since they may be provided as distinct functional modules, they may reside on different pieces of hardware. If in portions, some or all of the interoperability adapters 200 may be embedded with hardware, such as on a client device in the form of embedded software or firmware within a mobile communications handset. In addition, other interoperability adapters 200 may be implemented in software running on general purpose computing and/or network devices, such as a software program running on the application server 120. Accordingly, any or all of the interoperability adapters 200 may be implemented with software, firmware, or hardware modules, depending on the design of the communication network. Moreover, there need not be a one-to-one relationship between network applications and the interoperability adapters 200. A set of interoperability adapters 200 may be associated with multiple network applications just as multiple adapters 200 may be provided for a single network application.

On a functional level, the interoperability adapters 200 associated with a particular network application enable the communication of data between the network application and an interoperability domain. With a particular network application, the data and content are encoded in an application-specific protocol and/or provided in other application-specific data formats. For example, data about a subscriber's presence may be contained as a bit sequence in a header of a particular data packet, while media content such as a voice signal may be encoded using a particular audio codec. To abstract this data into the interoperability domain and thereby expose it for use with other applications, the interoperability adapters 200 extract the data, tag the data with any relevant information about the data, and provide the data to the shared resources 210 in the interoperability domain. The data provided to the shared resources 210 may comprise content used by the network application (such as a file attachment to an email) and/or metadata about the content (such as a destination address for the email). The shared resources 210 may be stored in a data repository that includes a shared memory, or the shared resources 210 can be implemented by establishing a path to where the shared resources 210 can be found.

In one embodiment, the interoperability adapters 200 are designed to support the full capabilities of their associated network applications to extract as much data as possible therefrom. The interoperability adapters 200 may therefore be designed not in view of existing needs, but with a view towards to additional data that might be required for interoperation with potential future network applications and enhancements. As a result, the interoperability adapters 200 may adapt to changing system configurations so that they need not be redesigned as new functionalities and network applications emerge. In addition to keeping the system up to date, this facilitates the development of enhanced functionalities by third parties, which may desire to use data from a particular network application not originally envisioned by the developers of the interoperability adapters 200.

Access to the shared resources 210 via the interoperability domain may be provided to one or more other network applications. In FIG. 2, for example, network application B may use data extracted from network application A and stored in the shared resources 210. This allows the two network applications to interoperate in some functional way without needing to know the particular data formats used by the other. Accordingly, the interoperability adapters 200 associated with network application B are able to repackage or otherwise bind data in the general format from the interoperability domain into a data stream usable by the network application B. Functionally, this is the converse of the extraction process described above for exposing a network application's data for use by others. Access to and routing of the data may be based on control modules in the interoperability domain, which may apply contextual rules 215. Various embodiments of the adapters and the functional control modules that can be used to implement an interoperability domain are described in more detail below.

Network Implementation of Interoperability System

Figure 3:
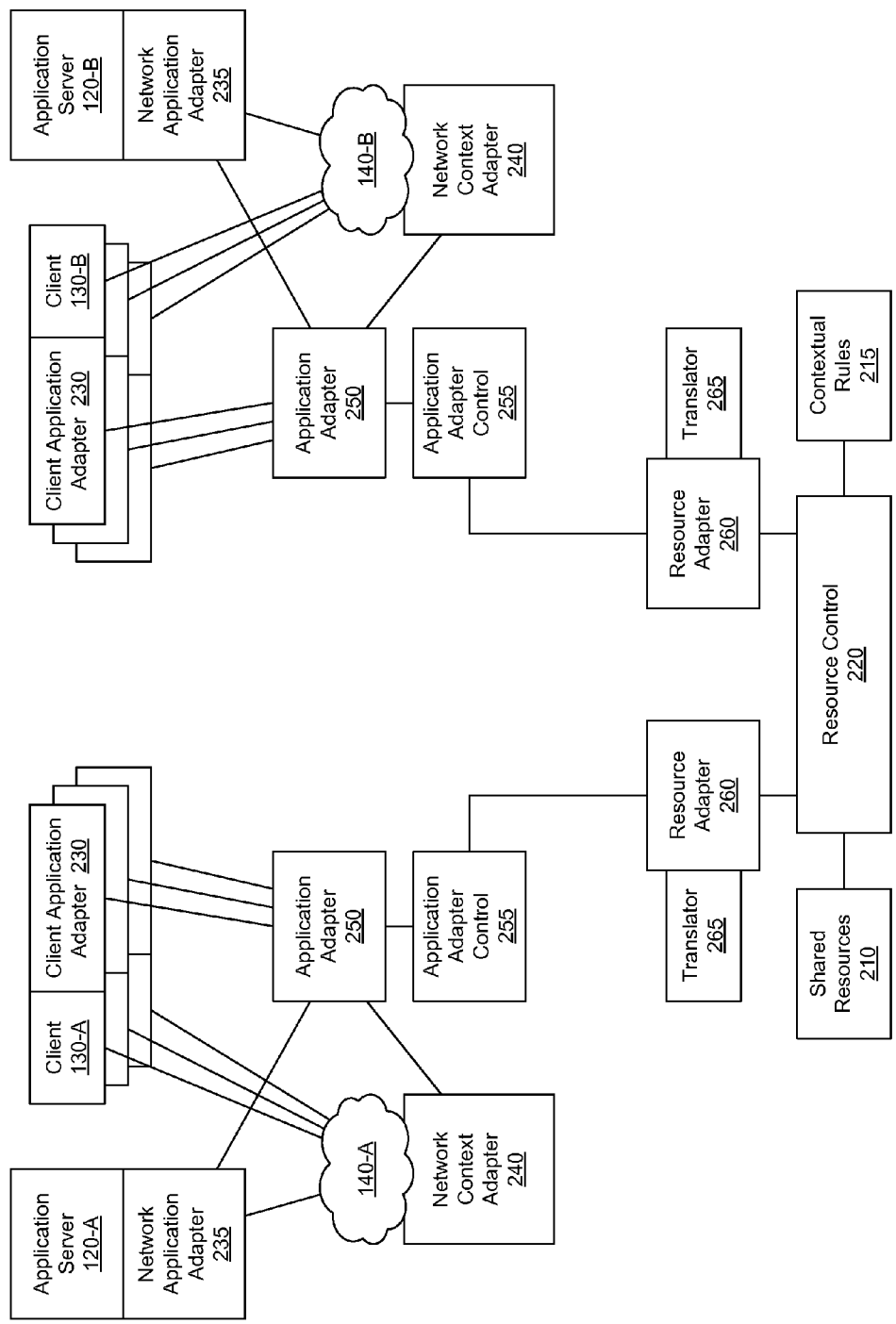
FIG. 3 is a block diagram of an interoperability system, in accordance with an embodiment of the invention.

FIG. 3 illustrates a system that enables an interoperability domain for two or more network applications. As described above, the interoperability system is provided in a communications environment in which subscribers may access services using a client 130 running on, for example, a communications device. A subscriber may access a network application provided by application server 120-A using client 130-A, while the same or a different subscriber may access another network application provided by application server 120-B using client 130-B. These network applications may involve communication between multiple clients 130 over networks 140-A and/or 140-B (e.g., text messaging), or the network applications may involve communication between a single client 130 and the associated application server 120 (e.g., a mapping application).

In the embodiment illustrated in FIG. 3, the interoperability adapters 200 described in connection with FIG. 2 are implemented by a plurality of adapters, which include a client application adapter 230, a network application adapter 235, a network context adapter 240, an application adapter 250, and a resource adapter 260. In combination, these perform the data extraction and tagging and the data binding functionalities described above for the interoperability adapters 200; however, they are divided into multiple distinct adapters in this implementation. Dividing the functionalities among a number of adapters allows the functions to be performed in different physical locations, which may be more efficient to reduce the bandwidth needed to transmit data over the communication networks 140. For example, extracting metadata at the application server 120 may require less bandwidth to transmit back to the interoperability domain than if the entire data stream were transmitted to the interoperability domain for extraction there. Also, the adapters may need to reside on different devices to obtain context information therefrom. For example, a client application adapter 230 may obtain information about the status of a handset device on which the client application adapter 230 is running.

Since the adapters are used to extract data from and bind data into the data format used by a particular network application, a set of adapters may be provided for each of the network applications for which interoperability is desired. However, any or all of the adapters 200 may be commonly associated with multiple network applications, thereby servicing multiple applications. As described above, the adapters may reside physically on different computing devices in the communications network.

In one embodiment, the client application adapter 230 is a software service agent designed for each particular client 130. The client application adapter 230 is configured to integrate content from the network application and the interoperability domain into a format that is optimized for the client application 130. The client application adapter 230 identifies application data (e.g., messaging or content) that is generated or received by client applications and is needed for interoperability or interaction with other applications or systems. The client adapter 230 then forwards the data and metadata as appropriate. For example, the client application adapter 230 forwards incoming data and metadata to the client 130 and forwards outgoing data and metadata towards the interoperability domain. In this way, the client application adapter 230 provides a link from the client application 130 to the network application and interoperability domain functions.

When forwarding data to the interoperability domain, the client application adapter 230 may create a label (i.e., metadata) identifying the client application from which the data was extracted and the type of data being routed to the interoperability domain. The data is then tagged with this generated label, and both are forwarded to the interoperability domain to be stored in the shared resources 210. The client adapter 230 may also be configured to monitor the client 130 and forward any pertinent events or other contextual information to the interoperability domain. This client context information may be used for various purposes, as described in more detail below.

The client application adapter 230 may be co-resident with its associated client application 130, or it may reside in the communication path of the client application 130. In one embodiment, the client application adapter 230 is integrated as part of the client application 130. The client application 130 may be the client component of a client-server application, or it may be one peer application in a peer-to-peer application.

In one embodiment, the network application adapter 235 resides on the application server 120 and is configured to communicate with the network application running thereon. The network application adapter 235 is configured to identify certain application data that should be routed to the interoperability domain (e.g., application messaging or content, and metadata associated therewith). The network application adapter 235 is also configured to delivers messages and other content from the interoperability domain to the appropriate network application and in the appropriate format for that network application. The application adapter 250 thus works in conjunction with the other adapters to provide a link between the interoperability domain and the network and client applications.

The network application associated with the network application adapter 235 may be the server component of a client-server application or a component application of the overall application that resides in the network (e.g., a network directory that is a separate component of a communication application).

In one embodiment, the application adapter 250 is a software service agent that is configured to capture any data from the network application (such as application messaging or content) to be routed to the interoperability framework for sharing with other network applications. When forwarding data to the interoperability domain, the application adapter 250 may create a label (i.e., metadata) identifying the network application from which the data was extracted and the type of data being routed to the interoperability domain. The data is then tagged with this generated label, and both are forwarded to the interoperability domain to be stored in the shared resources 210.

Various mechanisms are possible for capturing the data from the network application. In one embodiment, the network application subscribes to the interoperability domain and therefore can be configured to forward certain data to the application adapter 250 without direct intervention or request from the application adapter 250. In an alternative embodiment, the application adapter 250 is configured to intercept messages sent to and from the network application via the network 140. The application adapter 250 may then apply an algorithm to capture any data that is desired to send to the interoperability domain. In another embodiment, the application adapter 250 may be implemented as embedded program code that cooperates with the network application on the application server 120 and explicitly identifies messages and other data that should be sent to the interoperability domain. Once the desired data is obtained by the application adapter 250, it is converted into a general format that can be understood by the interoperability domain.

Another function of the application adapter 250 is to deliver shared data from the interoperability domain to the network application. In this direction of data flow, the application adapter 250 binds the data into a format usable by the network application, possibly using any available metadata about the content and any relevant context information. The application adapter 250 may also be configured to monitor the network 140 and/or the network application and forward pertinent events and other contextual information to the interoperability domain.

The application adapter 250 may reside physically as software on the application server 120, the client devices used by each subscriber, and/or any other computing device in communication with these elements. Because the application adapter 250 may be designed by third parties that developed the associated network application, the network adapter 250 can be made relatively simple. A simple design eases development and is possible where the adapter 250 is merely configured to filter, tag, and forward certain application data.

In one embodiment, the interoperability system also includes an application adapter control 255, coupled to the application adapter 250, for managing the mappings between the network application (including the client 130 and the application server 120) and the resource control 220 of the interoperability domain. In this way, the application adapter control 255 identifies the appropriate routing of data destined for the interoperability domain, and it routes data from the interoperability domain to the appropriate system for use with a network application.

The application adapter control 255 is configured to cause the data to and from the interoperability domain to be routed according to the mappings that it manages. This routing is between resources in the network application domain and the shared resources 210 in the interoperability domain. The routing may be influenced by metadata associated with the data being routed. For example, the application adapter control 255 may use the metadata itself to adjust the routing, or it may use contextual information (e.g., provided by an external context engine) to assist in making routing decisions.

In one embodiment, the application adapter control 255 itself acts as a router for the application adapter 250. In another embodiment, the application adapter control 255 updates the application adapter 250 with the direct routes according to the mapping. Alternatively, the application adapter control 255 may update a separate application routing function to maintain the appropriate mapping.

The application adapter control 255 may also identify which network application functions are to be interoperable. For example, the application adapter control 255 may maintain a list of the applications, protocols, codecs, and the like supported by a particular network application.

In one embodiment, the application adapter control 255 is a context engine that manages the mappings based on contextual information about elements in the interoperability system. This contextual information may include any information about the system that is available to the application adapter control 255. For example, the contextual information may include presence status of subscribers on the network, where the application adapter control 255 maps data for use with one network application if a subscriber is present (e.g., a voice call application) and to another if the subscriber is not (e.g., to a voicemail application). The application adapter control 255 may further maintain state and any other session information that may be required for one or more data connections between the network application domain and the interoperability domain.

In one embodiment, the interoperability system also includes a network context adapter 240. The network context adapter 240 monitors network conditions that may impact or influence application communications and provides this information to the interoperability domain. For example, depending on whether the client 130 is connected to the network 140 via a high-bandwidth connection or a low-bandwidth connection, the interoperability domain may use this information to adjust the bitrate of streaming video from a videoconference. The network context adapter 240 may monitor the network conditions directly or by inference. The network context adapter 240 resides in the network 140 that is being used by the client application, possibly in the communication path of the client applications.

These adapters at the network application side communicate with the resource adapter 260 to provide and obtain data from the interoperability domain. The resource adapter 260, in one embodiment, is a software service agent that provides an interface between the network applications and the shared resources 210. The functions of the resource adapter 260 may include providing any content or protocol manipulation needed for interoperability. Accordingly, the resource adapter 260 is configured to extract the shared data from the context of the application adapter 250, which may be in a more application-specific form even though accessible, to a more general context used in the interoperability domain. In this way, the resource adapter 260 and the application adapter 250 act in conjunction to provide a complete interface between the network application and the interoperability domain.

Various divisions of the responsibilities are possible between the application adapter 250 and the resource adapter 260. As described above, content provided from the application adapter 250 may be tagged with network application information and or protocols used to encode certain content; however, actual protocol conversions or decoding may not be performed by the application adapter 250. Instead, the resource adapter 260 may use the information in the tags to determine what, if any, decoding or translations are necessary. This division of the functions puts more of the computationally intensive functions on the resource adapter 260. As such, it may be favored where the resource adapter 260 resides on a computing device that has high processing power relative to the devices on the network.

To perform any necessary translation operations, the resource adapter 260 may use shared computational resources, or it may leverage on native functions that were a part of an existing service. In one embodiment, the resource adapter 260 is coupled to or includes one or more built-in translators 265, which provide translation from a specific protocol or encoding system to one more suitable for sharing within the interoperability domain. For example, the translator 265 may perform transcoding from a narrowband codec to a generic wideband codec (e.g., from EVRC to G.722.x), or from proprietary protocols into generic protocols (e.g., from iDEN to SIP). This may help to reduce latency delays and degradation of the shared data.

In the interoperability domain, the raw content that is to be shared across multiple network applications is stored as shared resources 210. The shared resource 210 may be implemented as one or more logical paths and/or as one or more storage devices for the shared data. In one embodiment, the shared resources 210 include the common data and metadata that are shared between interoperating network applications and the functional entities that facilitate the interoperability. In some embodiments, content or data from one network application may be immediately transmitted to another network application, so it may not need to be stored with shared resources 210. Because the content in the shared resources 210 has been extracted into the general context of the interoperability domain, the content is independent from the underlying network applications while preferably maintained with as much fidelity as is reasonable.

Any common or persistent information that is not meant to be quickly passed through the interoperation domain system may be stored by the resource control 220 in a common repository. For example, state or contextual information, or other persistent information, may be maintained in this common repository. In addition, functional elements that manipulate shared content from its original state (e.g., transcoding logic and protocol interworking logic) may be stored in this common repository and then used (e.g., by a resource adapter 260) when needed.

The resource control 220 maps and manages the resource adapters 260 so that incoming and outgoing data and content are mapped to particular directories or "pools" of shared data in the shared resource 210. By allocating the data shared among various network applications, the resource control 220 can decide which network applications have access to which others' data. In that way, the resource control 220 determines which network applications can interoperate using the interoperability domain. In one embodiment, the resource control 220 comprises a context engine that implements the mapping of network applications to the shared resources 210 according to a set of contextual rules 215. The resource control 220 may maintain a description of the capabilities of the interoperability domain and provides that information to the resource adapters 260 as needed. Information that the resource control 220 may maintain for this purpose may include protocols and network applications supported, mechanisms to add new capabilities, and mechanisms to advertise capabilities.

In one embodiment, the contextual rules 215 include the logic and rule sets used to determine how the network applications should interoperate. The contextual rules 215 may be fixed, or they may vary over time and depend on contextual information acquired from various elements throughout the system, such as contextual information about a network or about a device. The contextual information may be obtain from many different mechanisms, such as being statically configured with fixed rules determined by a system operator or being dynamically generated based on logical inferences that may require human intervention. Using the contextual rules 215, the resource control 220 may dynamically define which features are interoperable and establish control and priority definitions.

System Operation

In one embodiment, the interoperability system enables users of communication services that employ different network applications to communicate. An example of the process is provided here with reference to the system shown in FIG. 3. Although explained in the context of a data communication from a network application, it can be appreciated that the process can be from a client application and can be destined to another client application or a network application on the same or a different network.

In this example, a network application running on application server 120-A sends a communication signal to a client 130-B or to another network application 120-B in a different network domain, where the communication signal includes content needed for interoperability. The network application on application server 120-A can send the communication signal explicitly to its associated application adapter 250, or the application adapter 250 can monitor the network 140-A for the communication signal. The application adapter 250 (alone, or in combination with the other interoperability adapters) extracts the data needed for interoperability and labels or tags the data with metadata. This metadata may identify the application, the data itself, and/or any other pertinent information about the network application or its environment.

The application adapter control 255 uses the metadata to route the data and any metadata needed for interoperability to the appropriate resource adapter 250. If the interoperability information is destined for a specific client 130, the metadata for the client 130 may also be forwarded. The resource adapter 260 that receives the data and metadata uses the metadata from the application adapter 250 to determine any additional interoperability-specific metadata to include based on the application metadata. For example, if content has been transcoded, the metadata may identify the original and transcoded formats. If the data needs to be modified for maximum interoperability, the translator 265 may be applied for an additional modification.

The resource control 220 uses the metadata provided from the resource adapter 260 to create the shared resource 210 in an optimal form for the content of the data. The resource control 220 then maps the resource adapters 260 that are associated with the source and the destination to the shared resource 210. The resources control 220 may also ensure optimal use of any translator resources. With the appropriate mapping between the source and destination resource adapters 260, the data and metadata can be communicated through the interoperability domain via the shared resource 210, which contains the content of the interoperable data in the generalized context of the interoperability domain.

With this mapping in place, the resource adapter 260 associated with the destination receives the data from the shared resources 210, formats the data into an appropriate form, provides any necessary metadata, and forwards the data and metadata to the destination indicated by the metadata. The application adapter control 250 associated with the destination may provide destination routing support (e.g., assisting in multiple interoperable sessions destined for same client). The application adapter 250 that receives the data then binds the data into a signal for use by the native network application, and then forwards that signal to the destination network or client application.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above teachings.

Some portions of above description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

In addition, the terms used to describe various quantities, data values, and computations are understood to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or the like, refer to the action and processes of a computer system or similar electronic computing device, which manipulates and transforms data represented as physical (electronic) quantities within the computer system memories or registers or other such information storage, transmission, or display devices.

Embodiments of the invention also relate to an apparatus for performing the operations herein. This apparatus may be specially constructed for the required purposes, or it may comprise a general-purpose computing device selectively activated or reconfigured by a computer program stored in the computer. Such a computer program may be stored in a computer readable storage medium, including floppy disks, optical disks, CD-ROMs, magnetic-optical disks, read-only memories (ROMs), random access memories (RAMs), EPROMs, EEPROMs, magnetic or optical cards, or application specific integrated circuits (ASICs). Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, embodiments of the invention are not described with reference to any particular programming language. It is appreciated that a variety of programming languages may be used to implement various embodiments of the invention as described herein, and any references to specific languages are provided for disclosure of enablement and best mode of embodiments of the invention.

Finally, it should be noted that the language used in the specification has been principally selected for readability and instructional purposes, and it may not have been selected to delineate or circumscribe the inventive subject matter. Accordingly, the disclosure of the embodiments of the invention is intended to be illustrative, but not limiting, of the scope of the invention, which is set forth in the following claims.

What is claimed is:

1. An interoperability system for facilitating communications between network applications in a communications network, the system comprising:
    a plurality of application servers, each application server running a network application that provides a communications functionality on a network and capable of being at least one of a source and a destination for a communication over the network;
    a plurality of application servers, each application server running a network application that provides a communications;
    a first application adapter associated with a first application and configured to:
        extract application content from the first application, the application content having associated metadata that identifies data related to the first application;
    a resource adapter associated with the first application and configured to:
        perform a second extraction by extracting interoperability data of the first application from the extracted application content of the first application, the interoperability data of the first application being extracted into an interoperability domain independent of the first data format;
    a second application adapter associated with a second application configured receive extracted interoperability data of the second application;
    a resource control module configured to generate a mapping between the resource adapter associated with the first application and a resource adapter associated with the second application, the generating based on the interoperability data associated with the first application and the interoperability data associated with the second application, wherein the mapping comprises interoperability data that identifies the extracted application content and the associated metadata of the first application for use by the second application, and the resource control module is configured for optimal use of zero or more translator resources to perform interoperability between the first application and the second application;

the second resource adapter associated with the second application configured to select the extracted application content and the associated metadata that is interoperable with the second application based on the generated mapping;

the second application adapter configured to bind the selected application content and the associated metadata into a second data signal for use by the second application; and the application server associated with the second application configured to provide the second data signal to the second application running on a second communication device.

2. The system of claim 1, wherein the interoperability data of the first application is shared resource data, and the set of adapters for a particular network application is further configured to obtain metadata about the extracted shared resources data and label the extracted shared resources data with the metadata.

3. The system of claim 2, wherein the resource control module is configured to map a source network application and a destination network application for the shared resources data based on metadata associated with the shared resources data.

4. The system of claim 1, wherein one or more of the network applications reside in a client.

5. The system of claim 1, wherein one or more of the network applications reside in a network.

6. The system of claim 1, wherein one or more of the network applications are a client component of a client-server network application.

7. The system of claim 1, wherein one or more of the network applications are a server component of a client-server network application.

8. The system of claim 1, wherein one or more of the network applications are a peer component of a peer-to-peer network application.

9. The system of claim 1, wherein the set of adapters for at least one of the network applications includes a client application adapter that is in communication with a network application residing on a client, the client application adapter configured to identify and extract data from the network application residing on the client for use by another network application.

10. The system of claim 9, wherein the client application adapter resides on the client.

11. The system of claim 9, wherein the client application adapter is further configured to obtain context information about the client and forward the context information to the resource control module.

12. The system of claim 1, wherein the set of adapters for at least one of the network applications includes a network application adapter that is in communication with a network application, the network application adapter configured to identify and extract application data from the associated network application for use by another application.

13. The system of claim 1, wherein the set of adapters for at least one of the network applications includes a network context adapter configured to obtain context information about a network and forward the context information to the resource control module.

14. The system of claim 1, wherein the resource control module manages context information about at least one of the network and one or more clients connected to the network.

15. The system of claim 14, wherein the resource control module is configured to map the source and destination applications using the context information.

16. The system of claim 14, wherein the resource control module is configured to map the source and destination applications based at least in part on a set of contextual rules applied to the context information.

17. The system of claim 1, wherein the resource control module is coupled to a translator for converting a format of the shared resources data.

18. The system of claim 1, wherein the resource control module is configured to store at least a portion of the interoperability data in a common memory.

19. The system of claim 1, wherein the resource control module is configured to provide a network path to at least a portion of the interoperability data.

20. The system of claim 1, wherein the plurality of network applications include one or more voice applications.

21. The system of claim 1, wherein the plurality of network applications include one or more voice applications.

22. The system of claim 1, wherein the plurality of network applications include one or more Web service applications.

23. A method for facilitating communications between network applications in a communications network, the method comprising:

receiving a first data signal in a first application data format from a first application running on a first communication device, the first data signal containing application content for use with a second application;

extracting the application content from the first data signal by a first application adapter associated with the first application, the extracted application content having associated metadata that identifies data related to the first application;

performing a second extraction, by a resource adapter associated with the first application, extracting interoperability data of the first application from the extracted application content of the first application, the interoperability data of the first application being extracted into an interoperability domain independent of the first data format;

providing the extracted interoperability data of the first application from the first application adapter to a resource control module;

receiving, from a second application adapter associated with the second application, extracted interoperability data of the second application;

generating, by the resource control module, a mapping between the resource adapter associated with the first application and a resource adapter associated with the second application, the generating based on the interoperability data associated with the first application and the interoperability data associated with the second application, wherein the mapping comprises interoperability data that identifies the extracted application content and the associated metadata of the first application for use by the second application, and the resource control module is configured for optimal use of zero or more translator resources to perform interoperability between the first application and the second application;

selecting, at the second resource adapter associated with the second application, the extracted application content and the associated metadata that is interoperable with the second application based on the generated mapping;

binding, at the second application adapter, the selected application content and the associated metadata into a second data signal for use by the second application; and
providing the second data signal to the second application running on a second communication device.

24. The method of claim 23, further comprising:
obtaining metadata about the extracted application content; and
labeling the extracted application content with the metadata.

25. The method of claim 24, further comprising:
mapping the first network application and the second network application for the application content based on metadata associated with the application content.

26. The method of claim 23, wherein at least one of the first and second network applications resides in a client.

27. The method of claim 23, wherein at least one of the first and second network applications reside in a network.

28. The method of claim 23, wherein at least one of the first and second network applications is a client component of a client-server application.

29. The method of claim 23, wherein at least one of the first and second network applications is a server component of a client-server application.

30. The method of claim 23, wherein at least one of the first and second network applications is a peer component of a peer-to-peer application.

31. The method of claim 23, wherein the first network application is a client application, and the first data signal is received and the application content is extracted by a client application adapter that is in communication with the first network application.

32. The method of claim 31, wherein the client application adapter resides on a client.

33. The method of claim 31, further comprising:
obtaining context information about a client associated with the client application; and
forwarding the context information to the resource control module.

34. The method of claim 23, wherein the first network application resides on the network, and the first data signal is received and the application content is extracted by a network application adapter that is in communication with the first network application.

35. The method of claim 23, further comprising:
obtaining context information about a network; and
forwarding the context information to the resource control module.

36. The method of claim 23, further comprising:
maintaining context information about at least one of the network and clients connected to the network.

37. The method of claim 36, wherein the resource control module maps the first and second network applications using the context information.

38. The method of claim 36, wherein the resource control module maps the first and second network applications based at least in part on a set of contextual rules applied to the context information.

39. The method of claim 23, further comprising:
converting a format of the application content before binding the application content.

40. The method of claim 23, wherein providing the application content to the second application adapter comprises storing at least a portion of the application content in a shared resources memory.

41. The method of claim 23, wherein providing the application content to the second application adapter comprises providing a network path to at least a portion of the application content.

42. The method of claim 23, further comprising:
transmitting the first data signal over the network to a plurality of network applications.

43. The method of claim 23, wherein the first and second network applications are voice applications.

44. The method of claim 23, wherein the first and second network applications are messaging applications.

45. The method of claim 23, wherein the first and second network applications are Web service applications.

46. A computer program product for facilitating communications between network applications in a communications network, the computer program product comprising a non-transitory computer-readable storage medium containing computer program code for:
receiving a first data signal in a first application data format from a first application running on a first communication device, the first data signal containing application content for use with a second application;
extracting the application content from the first data signal by a first application adapter associated with the first application, the extracted application content having associated metadata that identifies data related to the first application;
performing a second extraction, by a resource adapter associated with the first application, extracting interoperability data of the first application from the extracted application content of the first application, the interoperability data of the first application being extracted into an interoperability domain independent of the first data format;
providing the extracted interoperability data of the first application from the first application adapter to a resource control module;
receiving, from a second application adapter associated with the second application, extracted interoperability data of the second application;
generating, by the resource control module, a mapping between the resource adapter associated with the first application and a resource adapter associated with the second application, the generating based on the interoperability data associated with the first application and the interoperability data associated with the second application, wherein the mapping comprises interoperability data that identifies the extracted application content and the associated metadata of the first application for use by the second application, and the resource control module is configured for optimal use of zero or more translator resources to perform interoperability between the first application and the second application;
selecting, at the second resource adapter associated with the second application, the extracted application content and the associated metadata that is interoperable with the second application based on the generated mapping;
binding, at the second application adapter, the selected application content and the associated metadata into a second data signal for use by the second application; and
providing the second data signal to the second application running on a second communication device.

47. The computer program product of claim 46, the computer-readable medium further containing computer program code for:
obtaining metadata about the extracted application content; and labeling the extracted application content with the metadata.

48. The computer program product of claim 47, the computer-readable medium further containing computer program code for:
mapping the first network application and the second network application for the application content based on metadata associated with the application content.

49. The computer program product of claim 46, wherein at least one of the first and second network applications resides in a client.

50. The computer program product of claim 46, wherein at least one of the first and second network applications reside in a network.

51. The computer program product of claim 46, wherein at least one of the first and second network applications is a client component of a client-server application.

52. The computer program product of claim 46, wherein at least one of the first and second network applications is a server component of a client-server application.

53. The computer program product of claim 46, wherein at least one of the first and second network applications is a peer component of a peer-to-peer application.

54. The computer program product of claim 46, wherein the first network application is a client application, and the first data signal is received and the application content is extracted by a client application adapter that is in communication with the first network application.

55. The computer program product of claim 54, wherein the client application adapter resides on a client.

56. The computer program product of claim 54, the computer-readable medium further containing computer program code for:
obtaining context information about a client associated with the client application; and
forwarding the context information to the resource control module.

57. The computer program product of claim 46, wherein the first network application resides on the network, and the first data signal is received and the application content is extracted by a network application adapter that is in communication with the first network application.

58. The computer program product of claim 46, the computer-readable medium further containing computer program code for:
obtaining context information about a network; and
forwarding the context information to the resource control module.

59. The computer program product of claim 46, the computer-readable medium further containing computer program code for:
maintaining context information about at least one of the network and clients connected to the network.

60. The computer program product of claim 59, wherein the resource control module maps the first and second network applications using the context information.

61. The computer program product of claim 59, wherein the resource control module maps the first and second network applications based at least in part on a set of contextual rules applied to the context information.

62. The computer program product of claim 46, the computer-readable medium further containing computer program code for:
converting a format of the application content before binding the application content.

63. The computer program product of claim 46, wherein providing the application content to the second application adapter comprises storing at least a portion of the application content in a shared resources memory.

64. The computer program product of claim 46, wherein providing the application content to the second application adapter comprises providing a network path to at least a portion of the application content.

65. The computer program product of claim 46, the computer-readable medium further containing computer program code for:
transmitting the first data signal over the network to a plurality of network applications.

66. The computer program product of claim 46, wherein the first and second network applications are voice applications.

67. The computer program product of claim 46, wherein the first and second network applications are messaging applications.

68. The computer program product of claim 46, wherein the first and second network applications are Web service applications.

* * * * *